(12) United States Patent
Hamada et al.

(10) Patent No.: US 7,973,117 B2
(45) Date of Patent: Jul. 5, 2011

(54) PROCESS FOR CONTINUOUSLY PRODUCING (METH)ACRYLIC ESTER POLYMER OR COPOLYMER

(75) Inventors: Kenichi Hamada, Tsukuba (JP); Yoshihiro Morishita, Tsukuba (JP); Tatsufumi Watanabe, Tsukuba (JP); Kazushige Ishiura, Tokyo (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 834 days.

(21) Appl. No.: 11/659,964

(22) PCT Filed: Aug. 11, 2005

(86) PCT No.: PCT/JP2005/014721
§ 371 (c)(1),
(2), (4) Date: Sep. 28, 2007

(87) PCT Pub. No.: WO2006/016639
PCT Pub. Date: Feb. 16, 2006

(65) Prior Publication Data
US 2008/0139759 A1    Jun. 12, 2008

(30) Foreign Application Priority Data

Aug. 13, 2004  (JP) ................ 2004-236111

(51) Int. Cl.
C08F 4/52       (2006.01)
C08F 2/00       (2006.01)
C08F 4/12       (2006.01)
C08F 20/00      (2006.01)
C08F 20/54      (2006.01)
C08F 118/02     (2006.01)

(52) U.S. Cl. ........ 526/177; 526/209; 526/216; 526/217; 526/226; 526/303.1; 526/307.1; 526/319

(58) Field of Classification Search .......... 526/177, 526/209, 216, 217, 226, 303.1, 307.1, 317.1, 526/319
See application file for complete search history.

(56) References Cited

U.S. PATENT DOCUMENTS
4,064,161 A * 12/1977 Lewis et al. ............ 526/320
(Continued)

FOREIGN PATENT DOCUMENTS
JP      7-309903        11/1995
(Continued)

OTHER PUBLICATIONS
JP 2003-268029, Eiji et al. published Sep. 2003. (English Translation).*
U.S. Appl. No. 11/659,964, filed Feb. 12, 2007, Hamada, et al.

*Primary Examiner* — William K Cheung
(74) *Attorney, Agent, or Firm* — Oblon, Spivak, McClelland, Maier & Neustadt, L.L.P.

(57) ABSTRACT

A continuous production process, for producing an (meth)acrylic ester (co)polymer comprises the step of continuously feeding an organoaluminum compound-containing polymerization initiator solution and an (meth)acrylic ester into a reactor to continuously obtain a living polymer-containing polymer reaction liquid. The {[molar quantity of methacrylic ester or acrylic ester]/([molar quantity of organoaluminum compound]−[molar quantity of polymerization initiator])} fed into the reactor is regulated to be 15 to 80, and the content of the (meth)acrylic ester in the total feed amount of a polymerization initiator solution and an (meth)acrylic ester fed into the reactor is regulated to not more than 5% by mass.

12 Claims, 3 Drawing Sheets

U.S. PATENT DOCUMENTS

| | | | |
|---|---|---|---|
| 5,527,859 A * | 6/1996 | Kempter et al. | 525/301 |
| 5,670,592 A * | 9/1997 | Teyssie et al. | 526/177 |
| 6,329,480 B1 | 12/2001 | Uchiumi et al. | |
| 6,555,637 B1 | 4/2003 | Hamada et al. | |
| 6,630,554 B1 | 10/2003 | Hamada et al. | |
| 6,767,976 B2 | 7/2004 | Hamada et al. | |
| 6,831,144 B2 | 12/2004 | Hamada et al. | |
| 6,878,789 B2 | 4/2005 | Uchiumi et al. | |
| 2003/0134998 A1 * | 7/2003 | Hamada et al. | 526/186 |

FOREIGN PATENT DOCUMENTS

| | | |
|---|---|---|
| JP | 8-169913 | 7/1996 |
| JP | 10-306112 | 11/1998 |
| JP | 2000-044631 | 2/2000 |
| JP | 2003-522256 | 7/2003 |
| JP | 2003-268029 * | 9/2003 |

* cited by examiner

US 7,973,117 B2

PROCESS FOR CONTINUOUSLY PRODUCING (METH)ACRYLIC ESTER POLYMER OR COPOLYMER

TECHNICAL FIELD

The present invention relates to a process for continuously producing a (meth)acrylic ester polymer or copolymer, in which molecular weight, molecular weight distribution, and the like are optimally designed according to the purpose of use, under mild conditions and in a high yield with good productivity in an industrially advantageous manner.

BACKGROUND ART

A living anionic polymerization method is a polymerization method in which deactivation and side reactions such as chain transfer occur less frequently and which is suitable for controlling molecular weight of a polymer and performing the molecular design of primary structure of a block copolymer. Hence, in recent years, attention is paid to the living anionic polymerization method as a production process for polymers requiring molecular design that has been difficult in the conventional radical polymerization method such as block copolymer or graft copolymer useful for thermoplastic elastomer, polymer compatibilizer, and the like, telechelic polymer having reactive functional groups, and star polymer useful for use in paint resin and hotmelt adhesive and the like.

Examples of monomers capable of undergoing anionic polymerization include non-polar anionic polymerizable monomers such as styrene, butadiene, isoprene, and derivatives thereof; polar anionic polymerizable monomers such as methacrylic ester, acrylic ester, methacrylamide, acrylamide, methacrylonitrile, acrylonitrile, and derivatives thereof; and the like. The non-polar anionic polymerizable monomers are capable of undergoing anionic polymerization while maintaining a high level of living properties and have already been applied to industrial polymerization. On the other hand, in the polar anionic polymerizable monomers, an anionic species of polymerizable end generally undergoes a side reaction with a polar functional group (ester group, amide group, nitrile group, etc.) in the monomer during anionic polymerization. Accordingly, in order to allow living anionic polymerization of the polar anionic polymerizable monomers to proceed while suppressing the side reaction, the polymerization usually needs to be carried out under an extremely low temperature condition such as −78° C., which requires a large cooling system at the time of industrialization and presents a problem such as an increase in facility cost.

The process for polymerization reaction is classified into two: a batch process in which raw materials used are collectively fed into a polymerization reactor, the reaction mixture is taken out after completion of the reaction to and transferred to a polymer isolation step, and the polymerization reactor is washed as necessary to perform a next polymerization reaction; and a continuous process in which the raw materials are continuously fed into a polymerization rector and the reaction mixture is continuously taken out from the reaction system and transferred to a polymer isolation step. Of these processes, the continuous process is more effective in reducing facility cost and running cost and also more effective in improving productivity.

Examples of application of the continuous production process to living anionic polymerization of methacrylic ester or acrylic ester as a process for carrying out living anionic polymerization of the polar anionic polymerizable monomers include:

(1) a continuous production process by anionic polymerization using a static mixer-type reactor (refer to Patent Reference 1);

(2) a continuous anionic polymerization process for (meth) acrylic monomer using a micro mixer (refer to Patent Reference 2);

(3) a production process for star-branched acrylic polymers (refer to Patent Reference 3); and the like.

Patent Reference 1: JP-A No. 56910/1994
Patent Reference 2: Specification of U.S. Pat. No. 5,886,112
Patent Reference 3: Specification of U.S. Pat. No. 6,013,735

In Example 1 of the above (1), a poly(methyl methacrylate) (PMMA) having a narrow molecular weight distribution of 1.09 is obtained. However, the reaction temperature is as extremely low as −78° C., which makes it difficult to practice industrially. Although in the specification of the above (1), "−40° C. or lower is preferred for polar monomers such as methacrylate and acrylate" is described as a preferred reaction temperature, it is difficult to industrially adopt even −40° C. Further, only continuous polymerization of methyl methacrylate is described in Examples, and no example with an acrylic ester or no example of continuous production of a block copolymer is described.

In Examples of the above (2), the molecular weight distribution of obtained poly (methyl methacrylate) is from 1.48 to 2.44, which is wider compared with the molecular weight distribution of 1.01 to 1.20 for polymer obtained by conventional living anionic polymerization. Thus, the living properties of the polymerization process in the above (2) are insufficient, which makes it difficult to perform molecular design of copolymers such as block copolymer and graft copolymer and produce them in that process. In fact, although poly(tert-butyl acrylate)-b-poly(methyl methacrylate) is produced in Example 14, the molecular weight distribution of the obtained diblock copolymer is as wide as 2.05, and the molecular weight distribution cannot be narrowly controlled.

Further, in Examples of the above (3), the molecular weight distribution of the obtained star polymer is from 1.3 to 1.8, which is wider compared with the molecular weight distribution of 1.01 to 1.20 for polymer obtained by conventional living anionic polymerization. Thus, the living properties of the polymerization process in the above (3) are also insufficient.

DISCLOSURE OF THE INVENTION

Hence, an object of the present invention is to provide a process for continuously producing a (meth) acrylic ester polymer or copolymer, in which molecular weight and molecular weight distribution are optimally designed according to the purpose of use, under a milder temperature condition rather than an extremely low temperature condition used in a conventional method, in a high yield, and with good productivity while maintaining a high polymerization rate and a high level of living properties.

Another object of the present invention is to provide a (meth)acrylic ester polymer or copolymer having a molecular weight distribution of 1.5 or lower that can be obtained by the continuous production process.

The present inventors have performed diligent studies to solve the above problems. As the result, the present inventors have attained the present invention by discovering that a (meth) acrylic ester polymer or copolymer in which molecular weight and molecular weight distribution are optimally designed according to the purpose of use can be produced under mild conditions, in a high yield, and with good productivity by including a step of continuously feeding an organoaluminum compound-containing polymerization initiator solution and at least one kind of methacrylic ester or acrylic ester into a reactor to continuously obtain a polymerization reaction liquid containing the organoaluminum compound and a living polymer and controlling not only the ratio of molar quantity of methacrylic ester or acrylic ester to ([molar quantity of organoaluminum compound]–[molar quantity of polymerization initiator]) fed into the reactor, i.e. {[molar quantity of methacrylic ester or acrylic ester]/([molar quantity of organoaluminum compound]–[molar quantity of polymerization initiator])}, within a predetermined range but also the content of the methacrylic ester or acrylic ester in the total feed amount of the polymerization initiator solution and the methacrylic ester or acrylic ester fed into the reactor to a level equal to or lower than a predetermined level.

That is, the present invention is (1) a process for continuously producing a (meth)acrylic ester polymer or copolymer by anionic polymerization, comprising:

having a step of continuously feeding an organoaluminum compound-containing polymerization initiator solution and at least one kind of methacrylic ester or acrylic ester into a reactor to continuously obtain a polymerization reaction liquid containing the organoaluminum compound and living polymers of the methacrylic ester and/or acrylic ester;

controlling the ratio of molar quantity of methacrylic ester or acrylic ester to ([molar quantity of organoaluminum compound]–[molar quantity of polymerization initiator]) fed into the reactor, i.e. {[molar quantity of methacrylic ester or acrylic ester]/([molar quantity of organoaluminum compound]–[molar quantity of polymerization initiator])}, to be 15 to 80; and controlling the content of the methacrylic ester or acrylic ester in the total feed amount of the polymerization initiator solution and the methacrylic ester or acrylic ester fed into the reactor to be 5% by mass or lower.

Further, the present invention is (2) a process for continuously producing a (meth)acrylic ester polymer or copolymer by anionic polymerization, comprising:

connecting two or more reactors, continuously feeding an organoaluminum compound-containing polymerization initiator solution and at least one kind of methacrylic ester or acrylic ester into a first reactor to continuously obtain a polymerization reaction liquid containing the organoaluminum compound and living polymers of the methacrylic ester and/or acrylic ester, and subsequently continuously feeding the polymerization reaction liquid and at least one kind of methacrylic ester or acrylic ester that is the same as or different from the methacrylic ester or acrylic ester fed into the first reactor into the (n+1)th reactor (n represents a natural number) to continuously obtain a polymerization reaction liquid containing the organoaluminum compound and living polymers of methacrylic ester and/or acrylic ester;

controlling, in at least one of the reactors, the ratio of molar quantity of methacrylic ester or acrylic ester to ([molar quantity of organoaluminum compound]–[molar quantity of polymerization initiator]) fed into the reactor, i.e. {[molar quantity of methacrylic ester or acrylic ester]/([molar quantity of organoaluminum compound]–[molar quantity of polymerization initiator])}, to be 15 to 80; and controlling the content of methacrylic ester or acrylic ester in the total feed amount of the polymerization initiator solution or the polymerization reaction liquid and the methacrylic ester or acrylic ester fed into the reactor to be 5% by mass or lower.

Still further, the present invention is (3) a process for continuously producing a polymer or copolymer according to (1) or (2) wherein (meth)acrylic ester is acrylic ester.

Still further, the present invention is (4) a (meth)acrylic ester polymer or copolymer with a molecular weight distribution of 1.5 or lower obtained by the process according to (1) or (2).

According to the continuous production process of the present invention, a (meth)acrylic ester polymer or copolymer having a narrow molecular weight distribution can be produced under a milder condition in a high yield and with good productivity while maintaining a high polymerization rate and a high level of living properties even though an extremely low temperature condition in the conventional method is not used.

The (meth)acrylic ester polymer or copolymer having a molecular weight distribution of 1.5 or lower that can be obtained by the process of the present invention can be preferably used for applications in thermoplastic elastomer, polymer compatibilizer, resin modifier, reactive polymer, paint resin, adhesive, viscosity index improver, pour point depressant, and the like.

BEST MODE FOR CARRYING OUT THE INVENTION

Hereinafter, the present invention is explained in detail. It should be noted that methacrylic ester and acrylic ester are sometimes collectively described as "(meth)acrylic ester".

For the polymerization initiator used in the present invention, known anionic polymerization initiators can be used, and for example, organolithium compounds, organosodium compounds, organopotassium compounds, and organomagnesium compounds are included.

The organolithium compounds include, for example, alkyl lithium and alkyl dilithium such as methyl lithium, ethyl lithium, n-propyl lithium, isopropyl lithium, n-butyl lithium, sec-butyl lithium, isobutyl lithium, tert-butyl lithium, n-pentyl lithium, n-hexyl lithium, tetramethylene dilithium, pentamethylene dilithium, and hexamethylene dilithium; aryl lithium and aryl dilithium such as phenyl lithium, m-tolyl lithium, p-tolyl lithium, xylyl lithium, and lithium naphthalene; aralkyl lithium and aralkyl dilithium such as benzyl lithium, diphenylmethyl lithium, trityl lithium, 1,1-diphenyl-3-methylpentyl lithium, α-methylstyryl lithium, and dilithium produced by the reaction of diisopropenyl benzene and butyl lithium; lithium amides such as lithium dimethylamide, lithium diethylamide, and lithium diisopropylamide; lithium alkoxides such as lithium methoxide, lithium ethoxide, lithium n-propoxide, lithium isopropoxide, lithium n-butoxide, lithium sec-butoxide, lithium tert-butoxide, lithium pentyloxide, lithium hexyloxide, lithium heptyloxide, and lithium octyloxide; lithium phenoxide, lithium 4-methylphenoxide, lithium benzyloxide, and lithium 4-methylbenzyloxide.

The organosodium compounds include, for example, alkyl sodium and alkyl disodium such as methyl sodium, ethyl sodium, n-propyl sodium, isopropyl sodium, n-butyl sodium, sec-butyl sodium, isobutyl sodium, tert-butyl sodium, n-pentyl sodium, n-hexyl sodium, tetramethylene disodium, pentamethylene disodium, and hexamethylene disodium; aryl sodium and aryl disodium such as phenyl sodium, m-tolyl sodium, p-tolyl sodium, xylyl sodium, and sodium naphthalene; aralkyl sodium and aralkyl disodium such as benzyl sodium, diphenylmethyl sodium, trityl sodium, and disodium produced by the reaction of diisopropenyl benzene and butyl sodium; sodium amides such as sodium dimethylamide, sodium diethylamide, and sodium diisopropylamide; sodium alkoxides such as sodium methoxide, sodium ethoxide, sodium n-propoxide, sodium isopropoxide, sodium n-butoxide, sodium sec-butoxide, sodium tert-butoxide, sodium pentyloxide, sodium hexyloxide, sodium heptyloxide, and sodium octyloxide; sodium phenoxide, sodium 4-methylphenoxide, sodium benzyloxide, and sodium 4-methylbenzyloxide.

The organopotassium compounds include, for example, alkyl potassium and alkyl dipotassium such as methyl potassium, ethyl potassium, n-propyl potassium, isopropyl potassium, n-butyl potassium, sec-butyl potassium, isobutyl potassium, tert-butyl potassium, n-pentyl potassium, n-hexyl potassium, tetramethylene dipotassium, pentamethylene dipotassium, and hexamethylene dipotassium; aryl potassium and aryl dipotassium such as phenyl potassium, m-tolyl potassium, p-tolyl potassium, xylyl potassium, and potassium naphthalene; aralkyl potassium and aralkyl dipotassium such as benzyl potassium, diphenylmethyl potassium, trityl potassium, and dipotassium produced by the reaction of diisopropenyl benzene and butyl potassium; potassium amides such as potassium dimethylamide, potassium diethylamide, and potassium diisopropylamide; potassium alkoxides such as potassium methoxide, potassium ethoxide, potassium n-propoxide, potassium isopropoxide, potassium n-butoxide, potassium sec-butoxide, potassium tert-butoxide, potassium pentyloxide, potassium hexyloxide, potassium heptyloxide, and potassium octyloxide; potassium phenoxide, potassium 4-methylphenoxide, potassium benzyloxide, and potassium 4-methylbenzyloxide.

The organomagnesium compounds include, for example, dimethyl magnesium, diethyl magnesium, dibutyl magnesium, ethyl butyl magnesium, methyl magnesium bromide, ethyl magnesium chloride, ethyl magnesium bromide, phenyl magnesium chloride, phenyl magnesium bromide, tert-butyl magnesium chloride, and tert-butyl magnesium bromide.

Among the above described compounds, the organolithium compounds are preferred in view of the fact that the polymerization initiation efficiency is high and polymerization reaction proceeds smoothly, and above all, n-butyl lithium, sec-butyl lithium, tert-butyl lithium, diphenylmethyl lithium, 1,1-diphenyl-3-methylpentyl lithium, and α-methylstyryl lithium are particularly preferred.

Further, part of the above polymerization initiators are used as a living anionic polymerization initiator for linear or cyclic conjugated diene compounds, vinyl aromatic compounds, (meth) acrylic amides, and the like, and a living polymer having a metal active end formed thereby may be used as a polymerization initiator of the present invention. Furthermore, an arbitrary polymer having a site that can be anionized is converted to an anion by anionic polymerization initiator such as organolithium compound, and that anion may be used as a polymerization initiator of the present invention. For example, poly(p-methylstyrene) in which an appropriate proportion of the methyl group at the para-position is anionized can be obtained by reacting poly(p-methylstyrene) dissolved in cyclohexane under an inert gas atmosphere with sec-butyl lithium in the presence of N,N,N',N'-tetramethylethylenediamine, and by using this as a polymerization initiator, a graft copolymer can be obtained.

As the polymerization initiator in the present invention, one kind of the above described polymerization initiators may be used alone, and a combination of two or more kinds may also be used.

Although the amount of the polymerization initiator used is not particularly limited in the present invention, the concentration thereof in a polymerization reaction liquid is usually in the range of 0.1 to 100 mmol/L, and the range of 1 to 10 mmol/L is preferred in view of smooth production of a target polymer or copolymer.

For the organoaluminum compound used in the present invention, it is preferable to use the organoaluminum compound represented by the following general formula (I) (hereinafter, referred to as organoaluminum compound (I)):

$$AlR^1R^2R^3 \quad (I)$$

(where, $R^1$, $R^2$, and $R^3$ each independently represent an alkyl group optionally having a substituent, cycloalkyl group optionally having a substituent, aryl group optionally having a substituent, aralkyl group optionally having a substituent, alkoxyl group optionally having a substituent, aryloxy group optionally having a substituent, or N,N-disubstituted amino group, or $R^1$ represents any one of the above groups and $R^2$ and $R^3$ represent a joined arylenedioxy group optionally having a substituent.)

In the above general formula, the alkyl groups represented independently by $R^1$, $R^2$, and $R^3$ include, for example, methyl, ethyl, n-propyl, isopropyl, n-butyl, isobutyl, sec-butyl, tert-butyl, 2-methylbutyl, 3-methylbutyl, n-octyl, and 2-ethylhexyl groups, the cycloalkyl group includes, for example, cyclopentyl and cyclohexyl groups. These alkyl groups and cycloalkyl groups may have a substituent, and such a substituent includes, for example, alkoxyl groups such as methoxy, ethoxy, isopropoxy, and tert-butoxy groups; and halogen atoms such as chlorine atom and bromine atom.

The aryl groups represented independently by $R^1$, $R^2$, and $R^3$ include, for example, phenyl and naphthyl, and the aralkyl group includes, for example, benzyl and 1-phenylethyl groups. These aryl groups and aralkyl groups may have a substituent, and such a substituent includes, for example, alkyl groups such as methyl, ethyl, n-propyl, isopropyl, n-butyl, isobutyl, sec-butyl, tert-butyl, 2-methylbutyl, 3-methylbutyl, n-octyl, and 2-ethylhexyl groups; alkoxyl groups such as methoxy, ethoxy, isopropoxy, and tert-butoxy groups; and halogen atoms such as chlorine atom and bromine atom.

The alkoxyl groups represented independently by $R^1$, $R^2$, and $R^3$ include, for example, methoxy, ethoxy, isopropoxy, and tert-butoxy groups, the aryloxy group includes, for example, phenoxy, 1-naphthoxy, 2-naphthoxyl, 9-phenanthryloxy, and 1-pyrenyloxy groups, and the N,N-disubstituted amino group includes, for example, dimethylamino, diethylamono, diisopropylamine, and bis(trimethylsilyl) amino groups. These alkoxyl groups, aryloxy groups, and N,N-disubstituted amino groups may have a substituent, and such a substituent includes, for example, alkyl groups such as methyl, ethyl, n-propyl, isopropyl, n-butyl, isobutyl, sec-butyl, tert-butyl, 2-methylbutyl, 3-methylbutyl, n-octyl, and 2-ethylhexyl groups; alkoxyl groups such as methoxy, ethoxy, isopropoxy, and tert-butoxy groups; and halogen atoms such as chlorine and bromine.

The arylenedioxy group represented by $R^2$ and $R^3$ joined together includes, for example, groups derived from 2,2'-biphenol, 2,2'-methylenebisphenol, 2,2'-methylenebis(4-methyl-6-tert-butylphenol), (R)-(+)-1,1'-bi-2-naphthol, (S)-(−)-1,1'-bi-2-naphthol, and the like. These arylenedioxy groups may have one or more substituents, and these substituents include, for example, alkyl groups such as methyl, ethyl, n-propyl, isopropyl, n-butyl, isobutyl, sec-butyl, tert-butyl, 2-methylbutyl, 3-methylbutyl, n-octyl, and 2-ethylhexyl groups; alkoxyl groups such as methoxy, ethoxy, isopropoxy, and tert-butoxy groups; and halogen atoms such as chlorine atom and bromine atom.

In the organoaluminum compound (I), at least one of $R^1$, $R^2$, and $R^3$ is preferred to be an aryloxy group that may have a substituent in view of enhancing living properties at the time of polymerization reaction of (meth)acrylic ester, and it is more preferred that two of $R^1$, $R^2$, and $R^3$ are aryloxy groups that may have a substituent. Such an aryloxy group that may have a substituent includes, for example, phenoxy, 2-methylphenoxy, 4-methylphenoxy, 2,6-dimethylphenoxy, 2,4-di-tert-butylphenoxy, 2,6-di-tert-butylphenoxy, 2,6-di-tert-butyl-4-methylphenoxy, 2,6-di-tert-butyl-4-ethylphenoxy, 2,6-diphenylphenoxy, and 7-methoxy-2-naphthoxy groups. Further, $R^2$ and $R^3$ may join to form an arylenedioxy group.

In view of living anionic polymerization, preferred organoaluminum compound (I) includes diethyl(2,6-di-tert-butyl-4-methylphenoxy)aluminum, diethyl(2,6-di-tert-butylphenoxy)aluminum, diisobutyl(2,6-di-tert-butyl-4-methylphenoxy)aluminum, diisobutyl(2,6-di-tert-butylphenoxy)aluminum, di-n-octyl(2,6-di-tert-butyl-4-methylphenoxy)aluminum, di-n-octyl(2,6-di-tert-butylphenoxy)aluminum, ethylbis(2,6-di-tert-butyl-4-methylphenoxy)aluminum, ethylbis(2,6-di-tert-butylphenoxy)aluminum, ethyl[2,2'-methylenebis(4-methyl-6-tert-butylphenoxy)]aluminum, isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum, n-octylbis(2,6-di-tert-butyl-4-methylphenoxy)aluminum, n-octylbis(2,6-di-tert-butylphenoxy)aluminum, n-octyl[2,2'-methylenebis(4-methyl-6-tert-butylphenoxy)]aluminum, methoxybis(2,6-di-tert-butyl-4-methylphenoxy)aluminum, methoxybis(2,6-di-tert-butylphenoxy)aluminum, methoxy[2,2'-methylenebis(4-methyl-6-tert-butylphenoxy)]aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)]aluminum, isopropoxybis(2,6-di-tert-butyl-4-methylphenoxy)aluminum, isopropoxybis(2,6-di-tert-butylphenoxy)aluminum, isopropoxy[2,2'-methylenebis(4-methyl-6-tert-butylphenoxy)]aluminum, tert-butoxybis(2,6-di-tert-butyl-4-methylphenoxy)aluminum, tert-butoxybis(2,6-di-tert-butylphenoxy)aluminum, tert-butoxy[2,2'-methylenebis(4-methyl-6-tert-butylphenoxy)]aluminum, tris(2,6-di-tert-butyl-4-methylphenoxy)aluminum, tris(2,6-diphenylphenoxy)aluminum, and the like. These may be used in one kind alone or in a combination of two or more kinds.

Methacrylic ester used as a raw material in the process of the present invention includes, for example, methyl methacrylate, ethyl methacrylate, propyl methacrylate, isopropyl methacrylate, allyl methacrylate, n-butyl methacrylate, tert-butyl methacrylate, cyclohexyl methacrylate, benzyl methacrylate, 2-ethylhexyl methacrylate, lauryl methacrylate, glycidyl methacrylate, trimethoxysilylpropyl methacrylate, methoxyethyl methacrylate, 2-(2-ethoxyethoxy)ethyl methacrylate, N,N-dimethylaminoethyl methacrylate, and N,N-diethylaminoethyl methacrylate.

Acrylic ester used as a raw material in the process of the present invention includes, for example, methyl acrylate, ethyl acrylate, propyl acrylate, isopropyl acrylate, allyl acrylate, n-butyl acrylate, tert-butyl acrylate, cyclohexyl acrylate, benzyl acrylate, 2-ethylhexyl acrylate, lauryl acrylate, glycidyl acrylate, trimethoxysilylpropyl acrylate, methoxyethyl acrylate, 2-(2-ethoxyethoxy) ethyl acrylate, N,N-dimethylaminoethyl acrylate, and N,N-diethylaminoethyl acrylate.

The process of the present invention is excellent in respect that polymers having a narrow molecular weight distribution can be produced under a mild temperature condition that has been difficult to use in the conventional process when an acrylic ester, particularly an acrylic ester formed from acrylic acid and a primary alcohol is used among the above methacrylic esters or acrylic esters.

In process of the present invention, a multifunctional compound having two or more carbon-carbon double bonds in a molecule can also be used as a (meth)acrylic ester. Further, a macromonomer having a carbon-carbon double bond of a (meth) acrylic ester at one end may also be used as a (meth) acrylic ester. (Meth)acrylic ester may be used in one kind alone or in a combination of two or more kinds. Furthermore, (meth)acrylic ester may also be used by diluting with a solvent used for polymerization at an arbitrary ratio.

It should be noted that the (meth) acrylic ester used in the process of the present invention is preferably subjected to a drying process sufficiently in advance under an inert gas atmosphere such as nitrogen, argon, or helium in respect that polymerization reaction is allowed to proceed smoothly. For the drying process, a dehydrating agent or a drying agent such as calcium hydroxide, molecular sieves, or activated alumina is preferably used.

The process of the present invention is carried out in the presence of a solvent. The solvent used is not particularly limited as long as it does not adversely affect the reaction and includes, for example, aliphatic hydrocarbons such as pentane, n-hexane, and octane; alicyclic hydrocarbons such as cyclopentane, methylcyclopentane, cyclohexane, methylcyclohexane, and ethylcyclohexane; aromatic hydrocarbons such as benzene, toluene, ethylbenzene, and xylene; and ethers such as diethyl ether, tetrahydrofuran, 1,4-dioxane, anisole, and diphenyl ether. Among these solvents, the use of an aromatic hydrocarbon is preferred from the standpoint that the solubility of produced polymer or copolymer therein is high, contamination to waste water is hard to occur, solvent recovery and purification are easy, and so forth, and the use of toluene or xylene is particularly preferred. These solvents may be used alone or in combination of two or more kinds. It should be noted that the solvent used is preferably purified beforehand by deaeration and dehydration in respect that polymerization reaction is allowed to proceed smoothly.

Further, the process of the present invention is preferably carried out in an inert gas atmosphere such as nitrogen, argon, or helium.

In the process of the present invention, it is possible to maintain high living properties as well as allow polymerization to proceed rapidly by adding an additive agent used as needed in the conventional anionic polymerization in the reaction system if necessary. The additive agent includes, for example, ethers such as dimethyl ether, dimethoxyethane, dimethoxyethane, and 12-crown-4; organic nitrogen-containing compounds such as triethylamine, N,N,N',N'-tetramethylethylenediamine, N,N,N',N",N"'-pentamethyldiethylenetriamine, 1,1,4,7,10,10-hexamethyltriethylenetetramine, pyridine, and 2,2'-dipyridyl; organic phosphorous compounds such as triethylphosphine, triphenylphosphine, and 1,2-bis(diphenylphosphino) ethane; inorganic salts such as lithium chloride, sodium chloride, and potassium chloride; alkali metal alkoxides such as lithium(2-methoxyethoxy) ethoxide and potassium tert-butoxide; and quaternary ammonium salts and quaternary phosphonium salts such as tetraethylammonium chloride, tetraethylammonium bromide, tetraethylphosphonium chloride, and tetraethylphosphonium bromide. Among these additive agents, ethers and organic nitrogen-containing compounds are preferred, and from the standpoint that not only polymerization is allowed to proceed rapidly by adding a small amount while maintaining living properties but also a solvent recovery process is simplified and load of waste water processing is reduced, organic nitrogen-containing compounds are more preferred. These additive agents may be used in one kind alone or in a combination of two or more kinds. Although, when the additive agent is added, the amount used is not particularly limited, the concentration thereof in the polymerization reaction liquid is generally preferred to be in the range of 0.1 to 100 mmol/l, and more preferably in the range of 1 to 10 mmol/l.

In general, the polymerization rate in anionic polymerization depends on monomer concentration in the polymerization reaction liquid. When the monomer concentration is high, the polymerization rate tends to become larger, and when the monomer concentration is low, the polymerization rate tends to become smaller. Accordingly, in the anionic polymerization in the usual batch process, the polymerization rate generally becomes smaller in the late polymerization stage when the monomer concentration is low compared with the early polymerization stage when the monomer concentration is high; thus there is a problem that time is needed for the last run in the late polymerization stage to increase the conversion rate. On the other hand, a condition of low monomer concentration is preferred in view of performing temperature control of polymerization reaction liquid by removing generated heat caused by polymerization; however, there is a problem that polymerization rate also decreases to result in a reduction in productivity. In the process of the present invention, it was possible to increase the polymerization rate and keep it approximately constant during polymerization from the initial stage to the late stage by performing anionic polymerization of a (meth) acrylic ester under a specified condition described later in the presence of an organoaluminum compound (I), thus enabling to establish a continuous production process with high productivity by shortening polymerization time.

In the process of the present invention, it was found by observing polymerization behaviors in detail that polymerization rate depended on the concentration of the organoaluminum compound (I) in a polymerization reaction liquid and the polymerization rate became larger when the concentration of the organoaluminum compound (I) was high, whereas the polymerization rate became smaller when the concentration of the organoaluminum compound (I) was low. This is due to the fact that the organoaluminum compound (I) present in the system coordinates with a (meth) acrylic ester in the polymerization reaction liquid, and the (meth)acrylic ester coordinated to the organoaluminum compound (I) is preferentially consumed in the polymerization reaction.

Since the organoaluminum compound (I) is coordinated more strongly with a polymerization initiator or an active-end species of a living polymer compared with the (meth)acrylic ester, the molar quantity of the organoaluminum compound (I) involved in activation of unreacted (meth)acrylic ester is regarded as the value resulting from subtracting the molar quantity of the polymerization initiator from the molar quantity of the organoaluminum compound (I) present in the polymerization reaction liquid (hereinafter, this is referred to as ([molar quantity of organoaluminum compound]−[molar quantity of polymerization initiator]). In the process of the present invention, by controlling the ratio of molar quantity of methacrylic ester or acrylic ester to ([molar quantity of organoaluminum compound]−[molar quantity of polymerization initiator]) fed into the reactor, i.e. {[molar quantity of methacrylic ester or acrylic ester]/([molar quantity of organoaluminum compound]−[molar quantity of polymerization initiator])}, to be 15 to 80, polymerization rate can be increased, reaction time can be shortened, and deactivation reaction of polymerization active-end species during polymerization is suppressed, and the production of polymer in which molecular weight, molecular weight distribution, and the like are optimally according to the purpose of use becomes possible.

In the process of the present invention, the quantity of methacrylic ester or acrylic ester continuously fed into the reactor is controlled so as to satisfy the above molar ratio. The molar ratio is preferably in the range of 15 to 70, more preferably in the range of 20 to 50 in view of the polymerization rate, living polymerization properties, and the amount of an organoaluminum compound (I) used relative to (meth) acrylic ester polymer or copolymer produced. When the molar ratio becomes larger than 80, the existing quantity of unreacted (meth) acrylic ester becomes larger, and a deactivation reaction in which an active-end species of living polymer itself present in the reaction system reacts with the (meth) acrylic ester and the polymerization termination tends to increase, thereby decreasing the living properties and making the control of molecular weight and molecular weight distribution more difficult. Further, when a block copolymer is produced, polymers deactivated during the course of polymerization reaction remain in the final product as contaminants without growing further, and the content of the target block copolymer in the final product is lowered, thus being undesirable. When the molar ratio is lower than 15, the cost of the organoaluminum compound (I) increases, and further, it becomes difficult to remove the organoaluminum compound (I) from the reaction mixtures after stopping the polymerization.

On the other hand, the result of detailed analysis on the deactivation reaction that occurs during anionic polymerization in the process of the present invention revealed that the deactivation rate depends on the monomer concentration, and when the monomer concentration is higher, the deactivation rate becomes larger, whereas when the monomer concentration is lower, the deactivation rate becomes smaller. Hence, in order to suppress such deactivation, it was found in the process of the present invention that the deactivation reaction could be decreased by controlling the content of a methacrylic ester or acrylic ester in the total feed amount of a polymerization initiator solution and the methacrylic ester or acrylic ester fed into the reactor to be 5% by mass or lower. To control this value as described above is extremely important in view of performing the anionic polymerization of the process of the present invention while maintaining high living properties. Under the condition that the content is higher than 5% by mass, the deactivation reaction becomes marked to result in lowering of the living properties, and the control of molecular weight and molecular weight distribution becomes difficult, thus being undesirable. In addition, an amount of heat generated at the time of polymerization becomes larger, and when the capacity of heat removal of a reactor used is insufficient, the temperature of polymerization reaction liquid becomes high, causing easy occurrence of the deactivation reaction.

In the present invention, besides homo polymer as a matter of course, various copolymers such as tapered copolymer, random copolymer, block copolymer, and graft copolymer can be produced depending on a combination of selection of kinds of monomers and polymerization reactors. For example, when a mixture in which two different kinds of monomers have been mixed in advance is used, a tapered copolymer and random copolymer can be produced. Further, when two reactors are connected in tandem, a monomer B is fed and polymerized, in a second reactor, to a living polymer that has been obtained by feeding and polymerizing a monomer A in a first reactor, thereby allowing an A-B type diblock copolymer to be produced. Further, by connecting three reactors in tandem in a similar manner, an A-B-A type or A-B-C type triblock copolymer can be produced. In addition, a homo polymer of high molecular weight can also be produced by connecting two or more reactors in tandem and feeding the same monomer in each reactor. Furthermore, a graft copolymer can also be produced by feeding a macromonomer as a monomer in each reactor. In this manner, various molecularly designed copolymers such as random copolymer, block copolymer, and graft copolymer can be produced according to the purpose of use by combining selection of kinds of monomers and reactors.

The molecular weight of a polymer or copolymer that can be produced by the process of the present invention varies over a wide range; however, it is preferred that the number average molecular weight is generally in the range of 1000 to 1000000 in terms of handling convenience, fluidity, dynamic properties, and the like of the obtained polymer or copolymer.

In the process of the present invention, the residence time of a polymerization reaction liquid in a reactor varies depending on the kind of (meth)acrylic ester used for polymerization, polymerization temperature, and the like; however, it is generally preferred that the residence time is set to 1- to 100-fold relative to the time required for polymerization. When the residence time is less than 1-fold relative to the time required for polymerization, the polymerization reaction liquid is discharged from the reactor before polymerization reaction is completed in the reactor. Therefore, there are fears that unreacted (meth)acrylic ester remaining in the polymerization reaction liquid may polymerize in piping after leaving the reactor to lead to generation of a high-molecular-weight product and the unreacted (meth)acrylic ester remains in a polymer or copolymer as a product. Further, when the residence time is more than 100-fold relative to the time required for polymerization, the rate of natural deactivation of polymerization active end tends to increase more. Time required for polymerization varies depending on the kind of (meth) acrylic ester, and the polymerization time when acrylic acid, for example, is used as (meth)acrylic ester is less than 10 sec, and the polymerization can also be completed within 1 sec depending on the condition.

Although in the process of the present invention, a temperature condition for the polymerization temperature may be chosen depending on the kind of (meth) acrylic ester, the concentration thereof in a polymerization reaction liquid, and the like, it is preferably in the range of −20 to 80° C. in view of shortening of polymerization time and less deactivation reaction during polymerization. Since this is a significantly milder temperature condition compared to the conventional anionic polymerization condition of (meth)acrylic ester, the cost of cooling system at the time of industrially practicing the process of the present invention can be greatly reduced compared to the conventional method.

As the reactor used in the process of the present invention, polymerization reactors conventionally used in continuous production processes can be used without particular limitation, and include, for example, a tube-type reactor and a tank-type reactor. Among these, the tube-type reactor is preferred, and particularly, a static mixer-type reactor provided with static mixing function is preferred.

The process for continuously producing a (meth)acrylic ester polymer or copolymer by anionic polymerization can continuously produce a (meth)acrylic ester polymer or copolymer by connecting preferably two or more reactors in tandem, continuously feeding an organoaluminum compound-containing polymerization initiator solution and at least one kind of methacrylic ester or acrylic ester into a first reactor to continuously obtain a polymerization reaction liquid containing the organoaluminum compound and living polymers of the methacrylic ester and/or acrylic ester, subsequently continuously feeding the polymerization reaction liquid and at least one kind of methacrylic ester or acrylic ester that is the same as or different from the methacrylic ester or acrylic ester fed into the first reactor into the (n+1)th reactor (n represents a natural number) to continuously obtain a polymerization reaction liquid containing the organoaluminum compound and living polymers of methacrylic ester and/or acrylic ester, controlling the ratio of molar quantity of methacrylic ester or acrylic ester to ([molar quantity of organoaluminum compound]−[molar quantity of polymerization initiator]) fed into the reactor, i.e. {[molar quantity of methacrylic ester or acrylic ester]/([molar quantity of organoaluminum compound]−[molar quantity of polymerization initiator])}, to be 80 or less in at least one of the reactors, and controlling the content of methacrylic ester or acrylic ester in the total feed amount of the polymerization initiator solution or the polymerization reaction liquid and methacrylic ester or acrylic ester fed into the reactor to be 5% by mass or less.

In the present invention, the polymerization reaction is terminated by adding a polymerization terminator into the polymerization reaction liquid that continuously flows out from the final reactor. The polymerization terminator can make use of, for example, a protonic compound such as water, methanol, acetic acid, or hydrochloric acid. Although the amount of the polymerization terminator used is not particularly limited, it is usually preferred that the polymerization terminator is added in the range of 1- to 100-fold molar excess with respect to a polymerization initiator used, and in addition, the polymerization terminator is preferably added in the range of 1- to 100-fold molar excess with respect to an organoaluminum compound (I) used.

When aluminum derived from an organoaluminum compound (I) used remains in a polymer or copolymer obtained by separation from the reaction mixture after terminating polymerization, physical properties of the polymer or copolymer or materials using them sometimes deteriorate, and therefore, it is preferred to remove aluminum derived from the organoaluminum compound after terminating polymerization. For the method of removing the aluminum, it is effective to subject a polymerization reaction liquid after addition of a polymerization terminator to a washing process using an acidic aqueous solution, an adsorption process using an adsorbent such as an ion exchange resin.

The method for obtaining the polymer or copolymer by separation from the polymerization reaction liquid after terminating the polymerization and subjecting to the aluminum-removing process is not particularly limited, and a known method can be appropriately employed. For example, a method in which a polymerization reaction liquid is poured into a poor solvent for a polymer or copolymer to precipitate out the polymer or copolymer, a method in which a polymer or copolymer is obtained by distilling off solvents from a polymerization reaction liquid under reduced pressure, and the like are included. In addition, it is also possible to recover a polymer or copolymer in a strand, pellet, or glutinous block form by removing most of solvents and low-boiling components contained in a polymerization reaction liquid using a thin film evaporator or the like, then supplying the residue continuously to a melt extruder, and distilling off the solvent in the melt extruder under reduced pressure.

EXAMPLES

Hereinafter, the present invention is explained more specifically based on examples, but the present invention is not limited to the following examples. It should be noted that chemicals used in the following examples and comparative examples were dried and purified by conventional methods, and transfer and supply thereof were carried out under nitrogen atmosphere.

Further, the measurement apparatuses used in the following examples and comparative examples are listed.

(1) Measurements of number average molecular weight (Mn) weight average molecular weight (Mw), and molecular weight distribution (Mw/Mn) by gel permeation chromatography (GPC)

Gel permeation chromatograph (HLC-8020) manufactured by Tosoh Corporation

Column: TSK gel of Tosoh Corporation; GMHXL, G4000HXL, and G5000HXL connected in tandem Eluent: tetrahydrofuran, flow rate 1.0 ml/min Column temperature: 40° C.

Calibration curve: produced by using standard polystyrene

Detection method: differential refractive index (RI)

(2) Measurement of Content of Each Polymer Block in Copolymer $^1$H-NMR: nuclear magnetic resonance apparatus (JNM-LA400) manufactured by JEOL Ltd., Solvent: deuterated chloroform (3) Measurement of Content of Triblock Copolymer in Copolymer by High Performance Liquid Chromatography (HPLC)

High performance liquid chromatograph (HPLC10Avp) manufactured by Shimadzu Corporation Detector: Evaporative light scattering detector (PL-EMD960) manufactured by Polymer Laboratories Ltd.

Column: SUPELCOSIL LC-3-Si manufactured by SUPELCO Inc.

Eluent: after maintained for 2 min at ethyl acetate/cyclohexane=50/50 (volume ratio), the volume ratio of ethyl acetate linearly raised to ethyl acetate/cyclohexane=100/0 (volume ratio) over 18 min and then maintained for 10 min at ethyl acetate/cyclohexane=100/0. Flow rate 1.0 ml/min.

Column temperature: 40° C.

(4) Measurement of Conversion Rate of Charged Monomer by Gas Chromatography (GC)

Instrument: gas chromatograph GC-14A manufactured by Shimadzu Corporation

Column: INERT CAP 1 (df=0.4 µm, 0.25 mm I.D.×60 m) manufactured by GL Sciences Inc.

Analysis condition: injection 300° C., detection 300° C., temperature programming: 60° C. (maintained for 0 min) →5° C./min→100° C. (maintained for 0 min)→30° C./min→300° C. (maintained for 2 min)

One example of a reaction apparatus usable in the process of the present invention is shown in FIG. 1. A first reactor is a tank-type reactor 1 equipped with a mixer to which a stock tank 2 for (meth) acrylic ester is connected. A second reactor is constructed of a total of two tube-type reactors where a static mixer-type reactor 8 equipped with a jacket is continuously connected in tandem with a static mixer-type reactor 9 equipped with a jacket having a tube diameter larger than the reactor 8. Coolant is passed through the jackets of the static mixer-type reactors equipped with a jacket, and the temperatures of the respective reactors are controlled. To the inlet portion of the second reactor, the first reactor and a second stock tank 5 for (meth) acrylic ester are connected via feed pumps 4 and 6, respectively. In the first tank-type reactor 1, a polymerization reaction of a first (meth)acrylic ester is carried out intermittently or continuously, and a polymer solution obtained by this reaction is continuously fed to the inlet portion of the second tube-type reactor 8 via the feed pump 4. At this time, a second (meth)acrylic ester is continuously fed simultaneously from the stock tank 5 via the feed pump 6, and a second polymerization reaction is allowed to take place in the second reactor, that is, in the tube-type reactor connected. When the kinds of the first (meth)acrylic ester and the second (meth) acrylic ester are changed, a block copolymer can be produced. At the outlet of the second reactor, a taking-out port 10 for polymerization reaction liquid is provided, and at the time when the second polymerization is terminated, the polymerization reaction liquid is taken out as needed. The polymerization reaction liquid can be subjected to a series of process steps from a polymerization termination operation to polymer extraction, or alternatively, it is also possible that the taken-out polymerization reaction liquid is stored for a short time using a tank-type reactor 11 equipped with a mixer temporarily as a stock tank and again introduced continuously into the second reactors (8 and 9) together with the second (meth) acrylic ester via the first reactor 1 to repeat polymerization. Further, when a third (meth)acrylic ester is fed from a stock tank 12 via a feed pump 13 using a tank-type reactor 11 equipped with a mixer as a third reactor to allow polymerization without taking out the polymerization reaction liquid, a triblock copolymer can be produced when the kind of the third (meth)acrylic ester is different from the second (meth)acrylic ester. Subsequently, by subjecting to a series of process steps from a polymerization termination operation to polymer extraction, a polymer or copolymer can be taken out.

Further, another example of the reaction apparatus usable in the process of the present invention is shown in FIG. 2. A first reactor is a tank-type reactor 18 equipped with a mixer to which a stock tank 16 for (meth) acrylic ester is connected. A second reactor is a tube-type reactor formed of 15 reactors connected in tandem, each comprising two kinds of static mixer-type reactors equipped with a jacket (51, 53) and a static mixer-type reducer equipped with a jacket 52 as shown in FIG. 3, and additionally a third reactor is constructed of a tower-type reactor 44 connected thereto in tandem. Coolant is passed through the jackets of the static mixer-type reactors (51, 53) equipped with a jacket and the static mixer-type reducer 52 equipped with a jacket in FIG. 3, and the temperatures of the respective reactors are controlled. First, in the first reactor 18, a polymerization reaction of a first (meth) acrylic ester is carried out intermittently or continuously. The polymerization reaction liquid obtained by this reaction is continuously fed into the second reactor via a feed pump 19. At this time, a solvent is continuously fed simultaneously from a stock tank 20 for solvent via a feed pump 21 as needed, and the polymer solution is diluted by using the solvent and a static mixer for mixing 24 to adjust the concentration of the polymerization reaction liquid.

Next, the polymerization reaction liquid is continuously fed into the inlet portion of the second reactor, that is, a first static mixer-type reactor 27 equipped with a jacket. At this time, a second (meth)acrylic ester is simultaneously fed from a stock tank 22 via a feed pump 23, and a polymerization reaction is allowed to take place in the first static mixer-type reactor 27 equipped with a jacket. Subsequently, the polymerization reaction liquid is continuously introduced into the second static mixer-type reactor 28 equipped with a jacket. At this time, the second (meth)acrylic ester is also fed into the second static mixer-type reactor 28 equipped with a jacket from the stock tank 22 via the feed pump 23, and a polymerization reaction is allowed to simultaneously take place in the second static mixer-type reactor 28. Similarly, polymerization reactions are allowed to take place sequentially and continuously in all of the 15 static mixer-type reactors (27 to 41). It should be noted that fine adjustment of each flow rate of the second (meth)acrylic ester continuously fed into each of the static mixer-type reactors (27 to 41) is carried out by flowmeters 55 and valves for flow control 54 that are provided on the front side of the feeding port of each reactor.

The polymerization reaction liquid obtained from the 15th static mixer-type reactor 41 equipped with a jacket is subsequently mixed with a third (meth)acrylic ester continuously fed from the stock tank 16 via a feed pump 17 by a static mixer for mixing 42 and then introduced into the lower portion of the third reactor, that is, the tower-type reactor 44. In the tower-type reactor 44, the polymerization reaction liquid flows from the lower portion to the upper portion of the tower-type reactor 44, a polymerization reaction proceeds during that time, and the polymerization reaction liquid is obtained from the upper portion. The polymerization reaction liquid is subsequently introduced into a static mixer for polymerization termination 47, and at the same time, a polymerization terminator is continuously fed to the static mixer for polymerization termination 47 from a stock tank for polymerization terminator 45 via a feed pump 46 to stop the polymerization. After that, the total or part of the reaction liquid is received in a stock tank 48. In the process up to this step, when the kinds of the first to the third (meth)acrylic esters are changed, a triblock copolymer can be produced. In addition, taking-out ports (49, 50) for polymerization reaction liquid are provided at the outlets of the static mixer-type reactor 41 and the tower-type reactor 44 (on the backside of the static mixer for polymerization termination 47 in the figure), and it is possible to take out a small amount of the polymerization reaction liquid to submit to analysis as required. Furthermore, the reaction liquid after terminating polymerization reaction that is stored in the stock tank 48 is continuously subjected to a series of process steps up to polymer extraction, and thus a polymer or copolymer can be taken out.

In the following Examples 1 and 2 and Comparative examples 1 and 2, in FIG. 1, a tank-type reactor equipped with a mixer having a volume of 1 m$^3$ as the first reactor, two tube-type reactors in total, in which a static mixer-type reactor equipped with a jacket in an inner diameter of 11 mm×a length of 1620 mm and a static mixer-type reactor equipped with a jacket in an inner diameter of 23 mm×a length of 2700 mm having a tube diameter larger than the reactor are continuously connected in tandem, as the second tube-type reactor part, and a tank-type reactor equipped with a mixer having a volume of 1 m$^3$ as the third reactor-stock tank for polymerization reaction liquid were used.

In Example 3 and Comparative example 3, a tank-type reactor equipped with a mixer having a volume of 1 m$^3$ as the first reactor in FIG. 2, a tube-type reactor formed of 15 reaction tubes connected in tandem, each of which comprises a static mixer-type reaction tube equipped with a jacket (inner diameter 11 mm×length 300 mm), a static mixer-type reducer equipped with a jacket (inner diameter 11 mm to inner diameter 28 mm×length 140 mm), and a static mixer-type reaction tube equipped with a jacket (inner diameter 28 mm×length 3470 mm) as the second reactor part that are connected to each other in FIG. 3, and a tower-type reactor having a volume of 0.95 m$^3$ (inner diameter 400 mm×length 7600 mm) as the third reactor were used.

Example 1

This was performed as follows using the reaction apparatus shown in FIG. 1.

[1] To a reactor 1 equipped with a mixer having a volume of 1 m$^3$ whose inside was replaced with nitrogen, 562 kg of toluene, 1.11 kg of 1,1,4,7,10,10-hexamethyltriethylenetetramine, and 13.2 kg of a toluene solution containing 8.2 moles of isobutylbis(2,6-di-tert-butyl-4-methylphenoxy) aluminum ($^i$BuAl(BHT)$_2$) were charged at 25° C. Next, 2.4 kg of a cyclohexane solution containing 4.1 moles of sec-butyllithium was added, and then 33.7 kg of methyl methacrylate (MMA) was added over 30 min. During that time, the temperature of the reaction liquid was maintained at 20 to 40° C. After completing the addition of MMA, the polymerization was driven for 10 min, and a polymerization reaction liquid containing poly(methyl methacrylate) in a state that polymerization ends retained living properties (hereinafter, this is referred to as living PMMA1) was prepared. The conversion rate of methyl methacrylate confirmed by GC was 100%. From GPC measurement of the reaction liquid whose polymerization reaction was terminated by sampling a small amount of the obtained living PMMA solution 1 in a vessel containing a small amount of methanol, the PMMA was found to have Mn=8330 and Mw/Mn=1.13.

[2] Subsequently, a second polymerization reaction was performed by continuously feeding the living PMMA solution 1 obtained as described above together with n-butyl acrylate (nBA) as follows.

First, the living PMMA solution 1 cooled to −15° C. beforehand at 200 kg/hr and n-butyl acrylate cooled to −6° C. at 6.8 kg/hr (content of n-butyl acrylate in the total solution fed: 3.3% by mass) were continuously fed simultaneously to the inlet port of the second reactor, i.e. the inlet port of the first tube-type reactor 8, and an operation in which the polymerization reaction liquid was continuously drawn out into the stock tank 11 equipped with a mixer having a volume of 1 m$^3$ was continuously carried out for 2 hours. The polymerization reaction was terminated by adding 2 kg of methanol into the polymerization reaction liquid obtained in the stock tank 11. The temperature of the polymerization reaction liquid at the outlet of the reactor 9 was −9° C. during the operation of continuous polymerization. From GC measurement of the reaction liquid whose polymerization reaction was terminated by sampling the polymerization reaction liquid obtained from the taking-out port 10 provided at the outlet of the reactor 9 in a vessel containing a small amount of methanol, the conversion rate of n-butyl acrylate was 100%. The ratio of molar quantity of n-butyl acrylate fed into the first tube-type reactor 8 of the second reactor to ([molar quantity of organoaluminum compound]−[molar quantity of polymerization initiator]) contained in the living PMMA solution 1, i.e. {[molar quantity of n-butyl acrylate]/([molar quantity of organoaluminum compound]−[molar quantity of polymerization initiator])}, was 34. The residence time of the mixed liquid of the living PMMA solution 1 and n-butyl acrylate in the second reactor part was 20 sec. The obtained polymer was poly(methyl methacrylate)-b-poly(n-butyl acrylate) diblock copolymer (PMMA-b-PnBA), and the diblock copolymer was found to have Mn=14920 and Mw/Mn=1.08 from GPC measurement. From $^1$H-NMR measurement, the content of PMMA block in the diblock copolymer was 62% by mass, and the content of PnBA block therein was 38% by mass.

Example 2

This was performed as follows using the reaction apparatus shown in FIG. 1.

(a) The living PMMA solution 1 prepared in the same manner as that in [1] of Example 1 was cooled to −15 to −13° C., and this at 200 kg/hr and n-butyl acrylate cooled to −6 to −4° C. at 6.8 kg/hr (content of n-butyl acrylate in the total solution fed: 3.3% by mass) were continuously fed simultaneously to the inlet port of the second reactor, i.e. the first tube-type reactor 8. The polymerization reaction liquid was continuously drawn out from the outlet of the reactor 9 into the stock tank 11 equipped with a mixer having a volume of 1 m³ and cooled to −15 to −13° C. beforehand. This is referred to as a polymerization reaction liquid 1. The ratio of molar quantity of n-butyl acrylate in the solution fed into the reactor 8 to ([molar quantity of organoaluminum compound]−[molar quantity of polymerization initiator]) contained in the living PMMA solution 1, i.e. {[molar quantity of n-butyl acrylate]/([molar quantity of organoaluminum compound]−[molar quantity of polymerization initiator])}, was 34. Further, the residence time of the mixed liquid of the living PMMA solution 1 and n-butyl acrylate in the second reactor part was 20 sec. A small amount of the obtained polymerization reaction liquid was sampled from the taking-out port 10 provided at the outlet of the reactor 9 in a vessel containing a small amount of methanol to terminate the polymerization reaction. When this reaction liquid was measured by GC, the conversion rate of n-butyl acrylate was 100%.

(b) Subsequently, after the total amount of this polymerization reaction liquid 1 was immediately transferred to the empty reactor 1 equipped with a mixer having a volume of 1 m³, this was again fed to the inlet of the second reactor, i.e. the inlet of the first tube-type reactor 8, at 200 kg/hr, and at the same time n-butyl acrylate cooled to −6 to −4° C. was continuously fed at 6.6 kg/hr (content of n-butyl acrylate in the total solution fed: 3.2% by mass). The polymerization reaction liquid was continuously drawn out from the outlet of the reactor 9 into the stock tank 11 cooled to −15 to −13° C. beforehand. This is referred to as a polymerization reaction liquid 2. The ratio of molar quantity of n-butyl acrylate in the solution fed into the reactor 8 to ([molar quantity of organoaluminum compound]−[molar quantity of polymerization initiator]) contained in the polymerization reaction liquid 1 was 34. Further, the residence time of the mixed liquid of the polymerization reaction liquid 1 and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(c) Subsequently, after the total amount of this polymerization reaction liquid 2 was immediately transferred to the empty reactor 1, this was again fed to the inlet of the second reactor, i.e. the inlet of the first tube-type reactor 8, at 200 kg/hr, and at the same time n-butyl acrylate cooled to −6 to −4° C. was continuously fed at 6.4 kg/hr (content of n-butyl acrylate in the total solution fed: 3.1% by mass). The polymerization reaction liquid was continuously taken out from the outlet of the reactor 9 into the stock tank 11 cooled to −15 to −13° C. beforehand. This is referred to as a polymerization reaction liquid 3. The ratio of molar quantity of n-butyl acrylate in the solution fed into the reactor 8 to ([molar quantity of organoaluminum compound]−[molar quantity of polymerization initiator]) contained in the polymerization reaction liquid 2 was 34. Further, the residence time of the mixed liquid of the polymerization reaction liquid 2 and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(d) Subsequently, after the total amount of this polymerization reaction liquid 3 was immediately transferred to the empty reactor 1, this was again fed to the inlet of the second reactor, i.e. the inlet of the first tube-type reactor 8, at 200 kg/hr, and at the same time n-butyl acrylate cooled to −6 to −4° C. was continuously fed at 6.2 kg/hr (content of n-butyl acrylate in the total solution fed: 3.0% by mass). The polymerization reaction liquid was continuously drawn out from the outlet of the reactor 9 into the stock tank 11 cooled to −15 to −13° C. beforehand. This is referred to as a polymerization reaction liquid 4. The ratio of molar quantity of n-butyl acrylate in the solution fed into the reactor 8 to ([molar quantity of organoaluminum compound]−[molar quantity of polymerization initiator]) contained in the polymerization reaction liquid 3 was 34. Further, the residence time of the mixed liquid of the polymerization reaction liquid 3 and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(e) Subsequently, after the total amount of this polymerization reaction liquid 4 was immediately transferred to the empty reactor 1, this was again fed to the inlet of the second reactor, i.e. the inlet of the first tube-type reactor 8, at 200 kg/hr, and at the same time n-butyl acrylate cooled to −6 to −4° C. was continuously fed at 6.0 kg/hr (content of n-butyl acrylate in the total solution fed: 2.9% by mass). The polymerization reaction liquid was continuously taken out from the outlet of the reactor 9 into the stock tank 11 cooled to −15 to −13° C. beforehand. This is referred to as a polymerization reaction liquid 5. The ratio of molar quantity of n-butyl acrylate in the solution fed into the reactor 8 to ([molar quantity of organoaluminum compound]−[molar quantity of polymerization initiator]) contained in the polymerization reaction liquid 4 was 34. Further, the residence time of the mixed liquid of the polymerization reaction liquid 4 and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(f) Finally, after the total amount of this polymerization reaction liquid 5 was immediately transferred to the empty reactor 1, this was again fed to the inlet of the second reactor, i.e. the inlet of the first tube-type reactor 8, at 200 kg/hr, and at the same time n-butyl acrylate cooled to −6 to −4° C. was continuously fed at 5.8 kg/hr (content of n-butyl acrylate in the total solution fed: 2.8% by mass). The polymerization reaction liquid was continuously taken out from the outlet of the reactor 9 into the stock tank 11 cooled to −15 to −13° C. beforehand. This is referred to as a polymerization reaction liquid 6. The ratio of molar quantity of n-butyl acrylate in the solution fed into the reactor 8 to ([molar quantity of organoaluminum compound]−[molar quantity of polymerization initiator]) contained in the polymerization reaction liquid 5 was 34. Further, the residence time of the mixed liquid of the polymerization reaction liquid 5 and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

A part (ca. 10 kg) of the obtained polymerization reaction liquid 6 was taken out from the stock tank 11, and the polymerization reaction was terminated by adding 50 g of methanol. The conversion rate of n-butyl acrylate confirmed by GC was 100%. The obtained polymer was poly(methyl methacrylate)-b-poly(n-butyl acrylate) diblock copolymer (PMMA-b-PnBA), and the diblock copolymer was found to have Mn=39890 and Mw/Mn=1.19 from GPC measurement. From ¹H-NMR measurement, the content of PMMA block in the diblock copolymer was 21% by mass, and the content of PnBA block therein was 79% by mass.

(g) On the other hand, while the polymerization reaction liquid 6 obtained in the stock tank 11 equipped with a mixer having a volume of 1 m³ was continuously maintained at −15 to −13° C., 9.1 kg of MMA per 200 kg was added over 5 min, and then the temperature was raised to 25° C. to allow polymerization for 6 hours. The polymerization reaction was terminated by adding 1 kg of methanol to the obtained polymerization reaction liquid. The conversion rate of MMA confirmed by GC was 100%. The obtained polymer was PMMA-b-PnBA-b-PMMA triblock copolymer, and the triblock copolymer was found to have Mn=43340 and Mw/Mn=1.25 from GPC measurement. From ¹H-NMR measurement, the content of PMMA block in the triblock copolymer was 35% by mass, and the content of PnBA block therein was 65% by mass. Further, the content of the triblock copolymer in the obtained polymer (blocking efficiency) determined by the HPLC method was 92%, and the amount of deactivation of polymerization ends during nBA polymerization by the above repeated operations of 6 times was found to be 8%. The GPC curve of the obtained triblock copolymer is shown in FIG. 4.

Example 3

This was performed as follows using the reaction apparatus shown in FIG. 2.

[1] To a reactor 18 equipped with a mixer having a volume of 1 m³ whose inside was replaced with nitrogen, 604 kg of toluene, 2.15 kg of 1,1,4,7,10,10-hexamethyltriethylenetetramine, and 40.3 kg of a toluene solution containing 27 moles of $^i$BuAl (BHT)$_2$ were charged at 25° C. Next, 7.75 kg of a cyclohexane solution containing 4.55 moles of sec-butyllithium was added, and then 169.1 kg of methyl methacrylate (MMA) was added over 30 min. During that time, the temperature of the reaction liquid was maintained at 20 to 40° C. After completing the addition of MMA, the polymerization was driven for 10 min, and a polymerization reaction liquid containing poly(methyl methacrylate) in a state that polymerization ends retained living properties (hereinafter, this is referred to as living PMMA2) was prepared. The conversion rate of methyl methacrylate confirmed by GC was 100%. From GPC measurement of the reaction liquid whose polymerization reaction was terminated by sampling a small amount of the obtained living PMMA solution 2 in a vessel containing a small amount of methanol, the PMMA was found to have Mn=22200 and Mw/Mn=1.08.

[2] The living PMMA solution 2 obtained as described above and toluene were fed to a static mixer 24 at flow rates of 57 kg/hr and 175 kg/hr, respectively, and mixed, followed by cooling to −10° C. via a heat exchanger 25. Then, the mixture was continuously fed to the inlet port of the first reactor 27 in the tube-type reactor part where 15 static mixer-type reactors equipped with a jacket shown in FIG. 3 were connected in tandem. On the other hand, n-butyl acrylate cooled to −10° C. was fed to the inlet port of each of the 1st to 15th tube-type reactors (static mixer-type reactors equipped with a jacket 27 to 41) as shown in FIG. 2 at 3.5 kg/hr each. The content of n-butyl acrylate in the total solution fed in each of the tube-type reactors (27-41) was 1.5 to 1.2% by mass. The ratio of molar quantity of n-butyl acrylate in the solution fed into each of the tube-type reactors (27-41) to ([molar quantity of organoaluminum compound]−[molar quantity of polymerization initiator]) contained in the living PMMA solution 2, i.e. {[molar quantity of n-butyl acrylate]/([molar quantity of organoaluminum compound]−[molar quantity of polymerization initiator])}, was 20. Further, the residence time of the mixed liquid of the living PMMA solution 2 and n-butyl acrylate in each of the tube-type reactors was 30 to 25 sec. The polymerization reaction liquid was continuously obtained from the outlet of the final (15th) tube-type reactor 41 and immediately subjected to the [3]rd step described below. Furthermore, a small amount of the obtained polymerization reaction liquid was sampled from the taking-out port 49 provided at the outlet of the final reactor 41 immediately in a vessel containing a small amount of methanol to terminate the polymerization reaction. When this reaction liquid was measured by GC, the conversion rate of n-butyl acrylate was 100%. The polymer obtained from the reaction liquid was poly(methyl methacrylate)-b-poly(n-butyl acrylate) diblock copolymer (PMMA-b-PnBA), and the diblock copolymer was found to have Mn=137000 and Mw/Mn=1.14 from GPC measurement. From ¹H-NMR measurement, the content of PMMA block in the diblock copolymer was 18% by mass, and the content of PnBA block therein was 82% by mass.

[3] This polymerization reaction liquid at 285 kg/hr and MMA at 9 kg/hr were continuously mixed with a static mixer 42, then heated up to 60° C. with a heat exchanger 43, and continuously introduced into the tower-type reactor 44 (content of MMA in the total solution fed: 3% by mass). The ratio of molar quantity of MMA in the solution fed into the tower-type reactor 44 to ([molar quantity of organoaluminum compound]−[molar quantity of polymerization initiator]) contained in the polymerization reaction liquid, i.e. {[molar quantity of MMA]/([molar quantity of organoaluminum compound]−[molar quantity of polymerization initiator])}, was 67. Further, the residence time of the mixed liquid of the polymerization reaction liquid and MMA in the tower-type reactor 44 was about 2.5 hours. The polymerization reaction liquid was continuously provided from the outlet of the tower-type reactor 44 to the stock tank 48. Furthermore, a small amount of the obtained polymerization reaction liquid was sampled from a taking-out port 50. When this reaction liquid was measured by GC, the conversion rate of MMA was 100%. The obtained polymer was PMMA-b-PnBA-b-PMMA triblock copolymer, and the triblock copolymer was found to have Mn=142000 and Mw/Mn=1.13 from GPC measurement. From ¹H-NMR measurement, the content of PMMA block in the triblock copolymer was 28% by mass, and the content of PnBA block therein was 72% by mass. The content of the triblock copolymer in the obtained polymer (blocking efficiency) determined by the HPLC method was 95%. The GPC curve of the obtained triblock copolymer is shown in FIG. 5.

Comparative Example 1

This was performed as follows using the reaction apparatus shown in FIG. 1.

[1] A polymerization reaction was performed in the same manner as in [1] of Example 1 except that the amount of $^i$BuAl(BHT)$_2$ charged in [1] of Example 1 was changed to 20.5 kg of a toluene solution containing 13.8 moles of $^i$BuAl(BHT)$_2$, and a polymer solution containing poly(methyl methacrylate) in a state that polymerization ends retained living properties was prepared. The conversion rate of methyl methacrylate confirmed by GC was 100%.

From GPC measurement of the reaction liquid whose polymerization reaction was terminated by sampling a small amount of the obtained living PMMA solution in a vessel containing a small amount of methanol, the living PMMA was found to have Mn=8330 and Mw/Mn=1.13.

[2] Subsequently, a second polymerization reaction was performed in the same manner as in [2] of Example 1 except that the amount of n-butyl acrylate continuously fed with the polymer solution was changed to 13.6 kg/hr (content of n-butyl acrylate in the total solution fed: 6.4% by mass) to obtain PMMA-b-PnBA. The ratio of molar quantity of n-butyl acrylate fed into the reactor 8 to ([molar quantity of organoaluminum compound]–[molar quantity of polymerization initiator]) contained in the living PMMA solution, i.e. {[molar quantity of n-butyl acrylate]/([molar quantity of organoaluminum compound]–[molar quantity of polymerization initiator])}, was 34. Further, the residence time of the mixed liquid of the living PMMA solution and n-butyl acrylate in the second reactor part was 20 sec. Furthermore, a small amount of the obtained polymerization reaction liquid was sampled from a taking-out port 10 provided at the outlet of the reactor 9 in a vessel containing a small amount of methanol to terminate the polymerization reaction. When this reaction liquid was measured by GC, the conversion rate of n-butyl acrylate was 100%, and the diblock copolymer was found to have Mn=17300 and Mw/Mn=1.59 from GPC measurement. From $^1$H-NMR measurement, the content of PMMA block in the diblock copolymer was 45% by mass, and the content of PnBA block therein was 55% by mass.

Comparative Example 2

This was performed as follows using the reaction apparatus shown in FIG. 1.

[1] To the reactor 1 equipped with a mixer having a volume of 1 m$^3$ whose inside was replaced with nitrogen, 450 kg of toluene, 0.88 kg of 1,1,4,7,10,10-hexamethyltriethylenetetramine, and 7.9 kg of a toluene solution containing 5.3 moles of $^i$BuAl(BHT)$_2$ were charged at 25° C. Next, 1.2 kg of a cyclohexane solution containing 3.7 moles of sec-butyllithium was added, and then 27 kg of methyl methacrylate (MMA) was added over 30 min. During that time, the temperature of the reaction liquid was maintained at 20 to 40° C. After completing the addition of MMA, the polymerization was driven for 10 min, and a polymerization reaction liquid (hereinafter, this is referred to as living PMMA solution 3) containing poly(methyl methacrylate) in a state that polymerization ends retained living properties (hereinafter, this is referred to as living PMMA) was prepared. The conversion rate of methyl methacrylate confirmed by GC was 100%. From GPC measurement of the reaction liquid whose polymerization reaction was terminated by sampling a small amount of the obtained living PMMA solution 3 in a vessel containing a small amount of methanol, the PMMA was found to have Mn=6680 and Mw/Mn=1.13.

[2] (a) The obtained living PMMA solution 3 was cooled to –15 to –13° C., and this at 200 kg/hr and n-butyl acrylate cooled to –9 to –7° C. at 6.8 kg/hr (content of n-butyl acrylate in the total solution fed: 3.3% by mass) were continuously fed simultaneously to the inlet of the second reactor, i.e. the first tube-type reactor 8. The polymerization reaction liquid was continuously taken out from the outlet of the reactor 9 into the stock tank 11 equipped with a mixer having a volume of 1 m$^3$ and cooled to –15 to –13° C. beforehand. This is referred to as a polymerization reaction liquid 1'. The ratio of molar quantity of n-butyl acrylate in the solution fed into the reactor 8 to ([molar quantity of organoaluminum compound]–[molar quantity of polymerization initiator]) contained in the living PMMA solution 3, i.e. {[molar quantity of n-butyl acrylate]/([molar quantity of organoaluminum compound]–[molar quantity of polymerization initiator])}, was 84. Further, the residence time of the mixed liquid of the living PMMA solution 3 and n-butyl acrylate in the second reactor part was 20 sec. A small amount of the obtained polymerization reaction liquid was sampled from the taking-out port 10 provided at the outlet of the reactor 9 in a vessel containing a small amount of methanol to terminate the polymerization reaction. When this reaction liquid was measured by GC, the conversion rate of n-butyl acrylate was 100%.

(b) Subsequently, after the total amount of this polymerization reaction liquid 1' was immediately transferred to the empty reactor 1, this was again fed to the inlet of the second reactor, i.e. the inlet of the first tube-type reactor 8, at 200 kg/hr, and at the same time n-butyl acrylate cooled to –9 to –7° C. was continuously fed at 6.6 kg/hr (content of n-butyl acrylate in the total solution fed: 3.2% by mass). The polymerization reaction liquid was continuously taken out from the outlet of the reactor 9 into the stock tank 11 cooled to –15 to –13° C. beforehand. This is referred to as a polymerization reaction liquid 2'. The ratio of molar quantity of n-butyl acrylate in the solution fed into the reactor 8 to ([molar quantity of organoaluminum compound]–[molar quantity of polymerization initiator]) contained in the polymerization reaction liquid 1' was 84. Further, the residence time of the mixed liquid of the polymerization reaction liquid 1' and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(c) Subsequently, after the total amount of this polymerization reaction liquid 2' was immediately transferred to the empty reactor 1, this was again fed to the inlet of the second reactor, i.e. the inlet of the first tube-type reactor 8, at 200 kg/hr, and at the same time n-butyl acrylate cooled to –9 to –7° C. was continuously fed at 6.4 kg/hr (content of n-butyl acrylate in the total solution fed: 3.1% by mass). The polymerization reaction liquid was continuously taken out from the outlet of the reactor 9 into the stock tank 11 cooled to –15 to –13° C. beforehand. This is referred to as a polymerization reaction liquid 3'. The ratio of molar quantity of n-butyl acrylate in the solution fed into the reactor 8 to ([molar quantity of organoaluminum compound]–[molar quantity of polymerization initiator]) contained in the polymerization reaction liquid 2' was 84. Further, the residence time of the mixed liquid of the polymerization reaction liquid 2' and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(d) Subsequently, after the total amount of this polymerization reaction liquid 3' was immediately transferred to the empty reactor 1, this was again fed to the inlet of the second reactor, i.e. the inlet of the first tube-type reactor 8, at 200 kg/hr, and at the same time n-butyl acrylate cooled to –9 to –7° C. was continuously fed at 6.2 kg/hr (content of n-butyl acrylate in the total solution fed: 3.0% by mass). The polymerization reaction liquid was continuously taken out from the outlet of the reactor 9 into the stock tank 11 cooled to −15 to −13° C. beforehand. This is referred to as a polymerization reaction liquid 4'. The ratio of molar quantity of n-butyl acrylate in the solution fed into the reactor 8 to ([molar quantity of organoaluminum compound]−[molar quantity of polymerization initiator]) contained in the polymerization reaction liquid 3' was 84. Further, the residence time of the mixed liquid of the polymerization reaction liquid 3' and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(e) Subsequently, after the total amount of this polymerization reaction liquid 4' was immediately transferred to the empty reactor 1, this was again fed to the inlet of the second reactor, i.e. the inlet of the first tube-type reactor 8, at 200 kg/hr, and at the same time n-butyl acrylate cooled to −9 to −7° C. was continuously fed at 6.0 kg/hr (content of n-butyl acrylate in the total solution fed: 2.9% by mass). The polymerization reaction liquid was continuously taken out from the outlet of the reactor 9 into the stock tank 11 cooled to −15 to −13° C. beforehand. This is referred to as a polymerization reaction liquid 5'. The ratio of molar quantity of n-butyl acrylate in the solution fed into the reactor 8 to ([molar quantity of organoaluminum compound]−[molar quantity of polymerization initiator]) contained in the polymerization reaction liquid 4' was 84. Further, the residence time of the mixed liquid of the polymerization reaction liquid 4' and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

(f) Finally, after the total amount of this polymerization reaction liquid 5' was immediately transferred to the empty reactor 1, this was again fed to the inlet of the second reactor, i.e. the inlet of the first tube-type reactor 8, at 200 kg/hr, and at the same time n-butyl acrylate cooled to −9 to −7° C. was continuously fed at 5.8 kg/hr (content of n-butyl acrylate in the total solution fed: 2.8% by mass). The polymerization reaction liquid was continuously taken out from the outlet of the reactor 9 into the stock tank 11 cooled to −15 to −13° C. beforehand. This is referred to as a polymerization reaction liquid 6'. The ratio of molar quantity of n-butyl acrylate in the solution fed into the reactor 8 to ([molar quantity of organoaluminum compound]−[molar quantity of polymerization initiator]) contained in the polymerization reaction liquid 5' was 84. Further, the residence time of the mixed liquid of the polymerization reaction liquid 5' and n-butyl acrylate in the second reactor part was 20 sec. Furthermore, a small amount of the obtained polymerization reaction liquid was sampled from the taking-out port 10 in a vessel containing a small amount of methanol to terminate the polymerization reaction. When this reaction liquid was measured by GC, the conversion rate of n-butyl acrylate was 100%.

A part (ca. 10 kg) of the obtained polymerization reaction liquid 6' was taken out from the stock tank 11, and the polymerization reaction was terminated by adding 50 g of methanol. The conversion rate of n-butyl acrylate confirmed by GC was 100%. The obtained polymer was poly(methyl methacrylate)-b-poly(n-butyl acrylate) diblock copolymer (PMMA-b-PnBA), and the diblock copolymer was found to have Mn=32470 and Mw/Mn=1.50 from GPC measurement. From $^1$H-NMR measurement, the content of PMMA block in the diblock copolymer was 21% by mass, and the content of PnBA block therein was 79% by mass.

(g) On the other hand, while the polymerization reaction liquid 6' obtained in the stock tank 11 equipped with a mixer having a volume of 1 m$^3$ was continuously maintained at −15 to −13° C., 9.1 kg of MMA per 200 kg was added over 5 min, and then the temperature was raised to 25° C. to allow polymerization for 6 hours. The polymerization reaction was terminated by adding 1 kg of methanol to the obtained polymerization reaction liquid. The conversion rate of MMA confirmed by GC was 100%. The obtained polymer was PMMA-b-PnBA-b-PMMA triblock copolymer, and the triblock copolymer was found to have Mn=34110 and Mw/Mn=1.59 from GPC measurement, indicating that the molecular weight distribution was wider compared to that in Example 2. From $^1$H-NMR measurement, the content of PMMA block in the triblock copolymer was 35% by mass, and the content of PnBA block therein was 65% by mass. Further, the content of the triblock copolymer in the obtained polymer (blocking efficiency) determined by the HPLC method was as low as 67%, and the amount of deactivation of polymerization ends during nBA polymerization by the above repeated operations of 6 times was found to be as high as 33% compared to that in Example 2. The GPC curve of the obtained triblock copolymer is also shown in FIG. 4.

Comparative Example 3

This was performed as follows using the reaction apparatus shown in FIG. 2.

[1] To the reactor 18 equipped with a mixer having a volume of 1 m$^3$ whose inside was replaced with nitrogen, 614 kg of toluene, 2.20 kg of 1,1,4,7,10,10-hexamethyltriethylenetetramine, and 30.9 kg of a toluene solution containing 21 moles of $^i$BuAl(BHT)$_2$ were charged at 25° C. Next, 4.75 kg of a cyclohexane solution containing 8.1 moles of sec-butyllithium was added, and then 179.1 kg of methyl methacrylate (MMA) was added over 30 min. During that time, the temperature of the reaction liquid was maintained at 20 to 40° C. After completing the addition of MMA, the polymerization was driven for 10 min, and a polymerization reaction liquid containing poly(methyl methacrylate) in a state that polymerization ends retained living properties (hereinafter, this is referred to as living PMMA4) was prepared. The conversion rate of methyl methacrylate confirmed by GC was 100%. From GPC measurement of the reaction liquid whose polymerization reaction was terminated by sampling a small amount of the obtained living PMMA solution 4 in a vessel containing a small amount of methanol, the PMMA was found to have Mn=21300 and Mw/Mn=1.09.

[2] The living PMMA solution 4 obtained as described above and toluene were fed to the static mixer 24 at flow rates of 49 kg/hr and 183 kg/hr, respectively, and mixed, followed by cooling to −10° C. via the heat exchanger 25. Then, the mixture was continuously fed to the inlet port of the first reactor 27 in the tube-type reactor part where 15 static mixer-type reactors equipped with a jacket shown in FIG. 3 were connected in tandem. On the other hand, n-butyl acrylate cooled to −10° C. was fed, at 7.9 kg/hr each, to the inlet port of each of the 1st, 3rd, 5th, 7th, 9th, 11th, and 13th tube-type reactors (static mixer-type reactors equipped with a jacket 27, 29, 31, 33, 35, 37, and 39) as shown in FIG. 2. The content of n-butyl acrylate in the total solution fed in each of the tube-type reactors (27, 29, 31, 33, 35, 37, and 39) was 3.3 to 2.7% by mass. The ratio of molar quantity of n-butyl acrylate in the solution fed into each of the tube-type reactors to ([molar quantity of organoaluminum compound]−[molar quantity of polymerization initiator]) contained in the living PMMA solution 4, i.e. {[molar quantity of n-butyl acrylate]/([molar quantity of organoaluminum compound]−[molar quantity of polymerization initiator])}, was 83. Further, the residence time of the mixed liquid of the living PMMA solution 4 and n-butyl acrylate in each of the tube-type reactors was 33 to 28 sec. The polymerization reaction liquid was continuously obtained from the outlet of the final (15th) tube-type reactor 41 and immediately subjected to the [3]rd step described below. Furthermore, a small amount of the obtained polymerization reaction liquid was sampled immediately from the taking-out port 49 provided at the outlet of the final reactor 41 in a vessel containing a small amount of methanol to terminate the polymerization reaction. When this reaction liquid was measured by GC, the conversion rate of n-butyl acrylate was 100%. The polymer obtained from the reaction liquid was poly(methyl methacrylate)-b-poly(n-butyl acrylate) diblock copolymer (PMMA-b-PnBA), and the diblock copolymer was found to have Mn=167000 and Mw/Mn=1.67 from GPC measurement. From $^1$H-NMR measurement, the content of PMMA block in the diblock copolymer was 16% by mass, and the content of PnBA block therein was 84% by mass.

[3] This polymerization reaction liquid at 287 kg/hr and MMA at 15 kg/hr were continuously mixed with the static mixer 42, then heated up to 60° C. with the heat exchanger 43, and continuously introduced into the tower-type reactor 44 (content of MMA in the total solution fed: 5% by mass). The ratio of molar quantity of MMA in the solution fed into the tower-type reactor 44 to ([molar quantity of organoaluminum compound]−[molar quantity of polymerization initiator]) contained in the polymerization reaction liquid was 202. Further, the residence time of the mixed liquid of the polymerization reaction liquid and MMA in the tower-type reactor 44 was about 2.5 hours. The polymerization reaction liquid was continuously provided from the outlet of the tower-type reactor 44 to the stock tank 48. Furthermore, a small amount of the obtained polymerization reaction liquid was sampled from the taking-out port 50. When this reaction liquid was measured by GC, the conversion rate of MMA was 100%. The obtained polymer was PMMA-b-PnBA-b-PMMA triblock copolymer. The triblock copolymer was found to have Mn=284000 and Mw/Mn=2.65 from GPC measurement; thus, a polymer having a narrow molecular weight distribution could not be obtained. From $^1$H-NMR measurement, the content of PMMA block in the triblock copolymer was 32% by mass, and the content of PnBA block therein was 68% by mass. The content of the triblock copolymer in the obtained polymer (blocking efficiency) determined by the HPLC method was 47%. The GPC curve of the obtained triblock copolymer is also shown in FIG. 5.

The triblock copolymers having low blocking efficiency that were obtained in Comparative examples 2 and 3 are poor in mechanical properties such as tensile strength and compression set and undesirable when used as thermoplastic elastomer.

INDUSTRIAL APPLICABILITY

According to the continuous production process of the present invention, a (meth)acrylic ester polymer or copolymer having a narrow molecular weight distribution can be produced with high yield and high productivity while allowing the polymerization to proceed at a higher rate at a polymerization temperature milder than in the conventional method and maintaining high living properties.

The (meth)acrylic ester polymer or copolymer having a molecular weight distribution of 1.5 or lower that can be obtained by the continuous production process of the present invention can be preferably used for applications in thermoplastic elastomer, polymer compatibilizer, resin modifier, reactive polymer, paint resin, base polymer for adhesive, viscosity index improver, pour point depressant, and the like.

Figure 1:
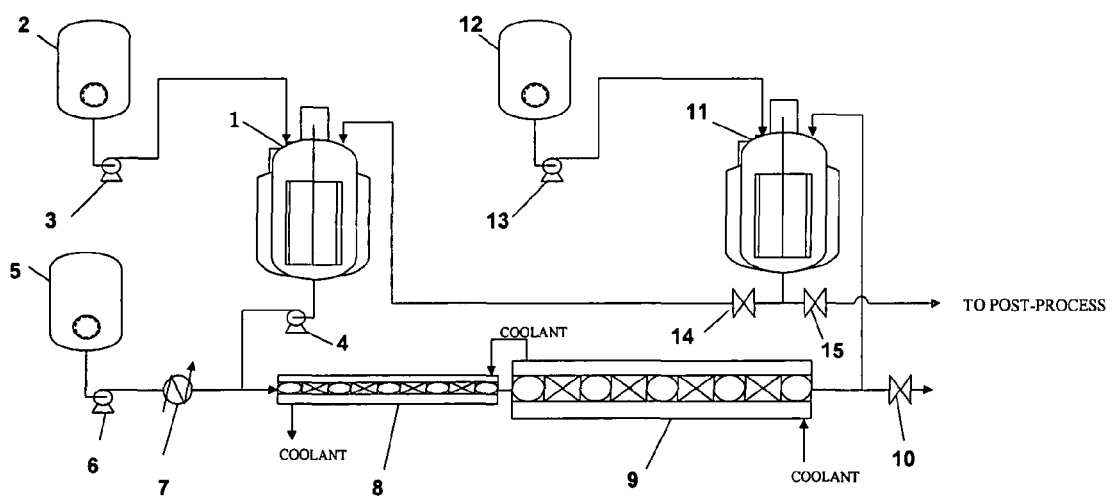
FIG. 1 is a schematic diagram of an example of a reaction apparatus, where reference numeral 1 denotes a reactor equipped with a mixer [a first polymerization reactor], 2 and 12 denote a first and third stock tanks for (meth)acrylic ester (methyl methacrylate), 3,4,6, and 13 denote feed pumps, 5 denotes a second stock tank for (meth)acrylic ester (n-butyl acrylate), 7 denotes a heat exchanger for cooling, 8 and 9 denote double tube-type static mixers for reaction [a second polymerization reactor], 10 denotes a taking-out port, 11 denotes a stock tank-reactor equipped with a mixer [a third polymerization reactor], and 14 and 15 denote valves.
Figure 3:
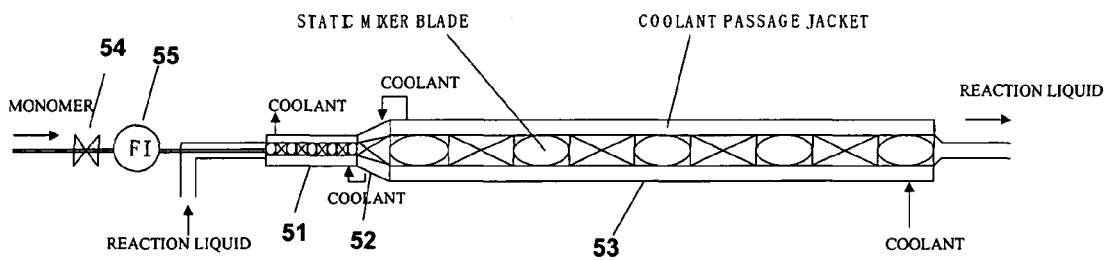
FIG. 3 is a detailed diagram to explain the static mixer-type reactors equipped with a jacket represented by the numerals 27 to 41 in FIG. 2, where numerals 51 and 53 denote static mixer-type reaction tubes equipped with a jacket, 52 denotes a static mixer-type reducer equipped with a jacket, 54 denotes a valve for flow control, and 55 denotes a flowmeter.
Figure 2:
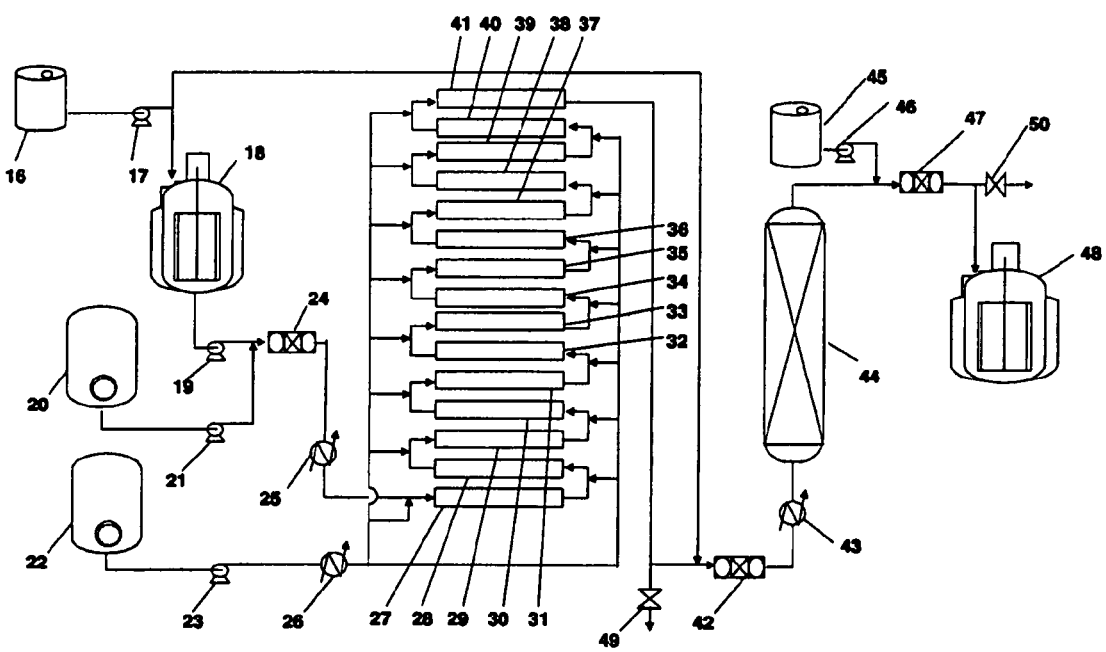
FIG. 2 is a schematic diagram of another example of the reaction apparatus, where reference numeral 16 denotes a first and third stock tank for (meth) acrylic ester (methyl methacrylate), 17, 19, 21, 23, and 46 denote feed pumps, 18 denotes a reactor equipped with a mixer [a first polymerization reactor], 20 denotes a stock tank for solvent (toluene), 21 denotes a second stock tank for (meth)acrylic ester (n-butyl acrylate), 24 and 49 denote static mixers for mixing, 25 and 26 denote heat exchangers for cooling, 27 to 41 denote static mixer-type reactors equipped with a jacket [a second polymerization reactor], 43 denotes a heat exchanger for heating, 44 denotes a tower-type reactor [a third polymerization reactor], 45 denotes a stock tank for polymerization terminator (methanol), 47 denotes a static mixer for polymerization termination, 48 denotes a stock tank equipped with a mixer, and 49 and 50 denote taking-out ports.
Figure 4:
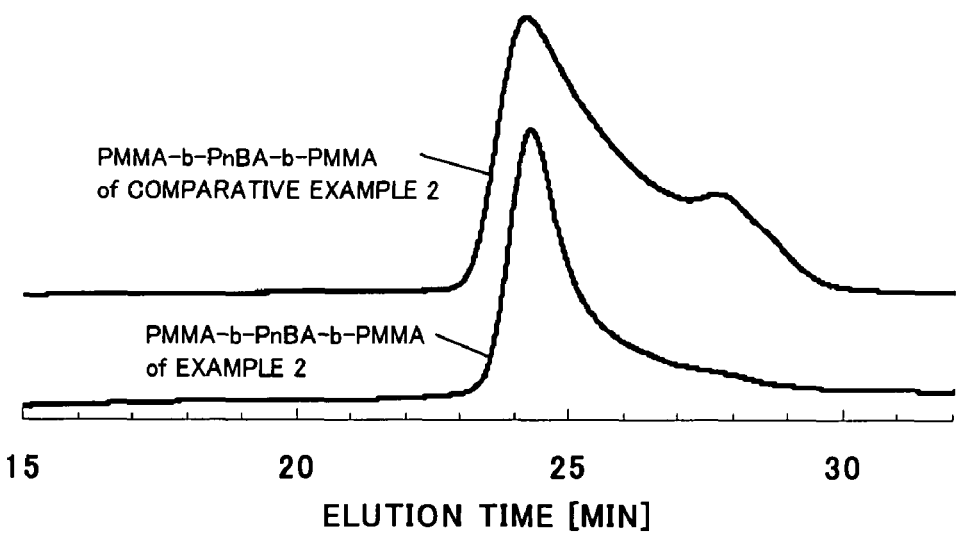
FIG. 4 is a graph showing GPC curves of triblock copolymers (PMMA-b-PnBA-b-PMMA) obtained in Example 2 and Comparative example 2.
Figure 5:
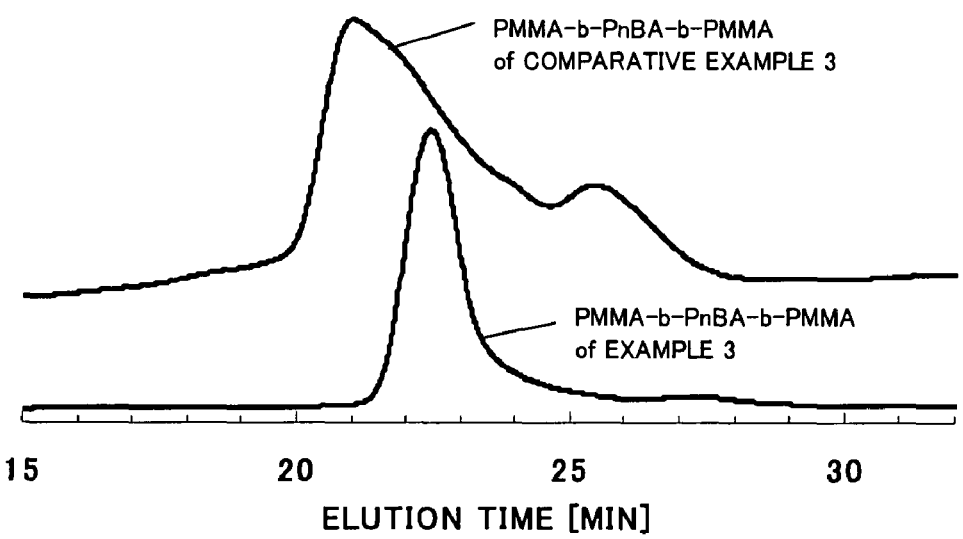
FIG. 5 is a graph showing GPC curves of triblock copolymers (PMMA-b-PnBA-b-PMMA) obtained in Example 3 and Comparative example 3.

The invention claimed is:

1. A process for continuously producing a (meth)acrylic ester polymer or copolymer by anionic polymerization, comprising:

connecting two or more reactors, continuously feeding an organoaluminum compound-containing polymerization initiator solution and at least one kind of methacrylic ester or acrylic ester into a first reactor to continuously obtain a polymerization reaction liquid containing the organoaluminum compound and living polymers of the methacrylic ester and/or acrylic ester, and subsequently continuously feeding the polymerization reaction liquid and at least one kind of methacrylic ester or acrylic ester that is the same as or different from the methacrylic ester or acrylic ester fed into the first reactor into the (n+1)th reactor (n represents a natural number) to continuously obtain a polymerization reaction liquid containing the organoaluminum compound and living polymers of methacrylic ester and/or acrylic ester;

controlling, in at least one of the reactors, the ratio of molar quantity of methacrylic ester or acrylic ester to ([molar quantity of organoaluminum compound]−[molar quantity of polymerization initiator]) in the reactor, i.e. {[molar quantity of methacrylic ester or acrylic ester]/([molar quantity of organoaluminum compound]−[molar quantity of polymerization initiator])}, to be 15 to 80; and controlling the content of methacrylic ester or acrylic ester in the total feed amount of the polymerization initiator solution or the polymerization reaction liquid and the methacrylic ester or acrylic ester fed into the reactor to be 5% by mass or lower.

2. The process for continuously producing a polymer or copolymer according to claim 1, wherein (meth) acrylic ester is acrylic ester.

3. A (meth)acrylic ester polymer or copolymer with a molecular weight distribution of 1.5 or lower obtained by a process according to claim 1.

4. The process for continuously producing a polymer or copolymer according to claim 1, wherein the polymerization initiator solution comprises an organolithium compound selected from the group consisting of alkyl lithium, alkyl dilithium, aryl lithium, aryl dilithium, aralkyl lithium, and aralkyl dilithium.

5. The process for continuously producing a polymer or copolymer according to claim 2, wherein the acrylic ester is an acrylic ester of primary alcohol.

6. The process for continuously producing a polymer or copolymer according to claim 1, wherein the organoaluminum compound is represented by a general formula (I), $$AlR^1R^2R^3 \qquad (I)$$

where $R^1$, $R^2$, and $R^3$ each independently represent one selected from the group consisting of an alkyl group optionally having a substituent, cycloalkyl group optionally having a substituent, aryl group optionally having a substituent, aralkyl group optionally having a substituent, alkoxyl group optionally having a substituent, aryloxy group optionally having a substituent, and N,N-disubstituted amino group, or $R^1$ represents one selected from the group consisting of an alkyl group optionally having a substituent, cycloalkyl group optionally having a substituent, aryl group optionally having a substituent, aralkyl group optionally having a substituent, alkoxyl group optionally having a substituent, aryloxy group optionally having a substituent, and N,N-disubstituted amino group, and $R^2$ and $R^3$ represent a joined arylenedioxy group optionally having a substituent, wherein at least one of $R^1$, $R^2$, and $R^3$ is an aryloxy group that may have a substituent.

7. A process for continuously producing a (meth)acrylic ester polymer or copolymer by anionic polymerization, comprising:

connecting two or more reactors, continuously feeding at least one kind of methacrylic ester or acrylic ester into a reactor comprising an organoaluminum compound-containing polymerization initiator solution to obtain a polymerization reaction liquid containing the organoaluminum compound and living polymers of the methacrylic ester and/or and acrylic ester, and subsequently continuously feeding the polymerization reaction liquid and at least one kind of methacrylic ester or acrylic ester that is the same as or different from the methacrylic ester or acrylic ester fed into the first reactor into the (n+1)th reactor (n represents a natural number) to continuously obtain a polymerization reaction liquid containing the organoaluminum compound and living polymers of methacrylic ester and/or acrylic ester;

controlling, in at least one of the reactors, the ratio of molar quantity of methacrylic ester or acrylic ester to ([molar quantity of organoaluminum compound]−[molar quantity of polymerization initiator]) in the reactor, i.e. {[molar quantity of methacrylic ester or acrylic ester]/([molar quantity of organoaluminum compound]−[molar quantity of polymerization initiator])}, to be 15 to 80; and controlling the content of methacrylic ester or acrylic ester in the total feed amount of the polymerization initiator solution or the polymerization reaction liquid and the methacrylic ester or acrylic ester fed into the reactor to be 5% by mass or lower.

8. The process for continuously producing a polymer or copolymer according to claim 7, wherein (meth)acrylic ester is acrylic ester.

9. A (meth)acrylic ester polymer or copolymer with a molecular weight distribution of 1.5 or lower obtained by a process according to claim 7.

10. The process for continuously producing a polymer or copolymer according to claim 7, wherein the polymerization initiator solution comprises an organolithium compound selected from the group consisting of alkyl lithium, alkyl dilithium, aryl lithium, aryl dilithium, aralkyl lithium, and aralkyl dilithium.

11. The process for continuously producing a polymer or copolymer according to claim 8, wherein the acrylic ester is an acrylic ester of primary alcohol.

12. The process for continuously producing a polymer or copolymer according to claim 7, wherein the organoaluminum compound is represented by a general formula (I), $$AlR^1R^2R^3 \qquad (I)$$

where $R^1$, $R^2$, and $R^3$ each independently represent one selected from the group consisting of an alkyl group optionally having a substituent, cycloalkyl group optionally having a substituent, aryl group optionally having a substituent, aralkyl group optionally having a substituent, alkoxyl group optionally having a substituent, aryloxy group optionally having a substituent, and N,N-disubstituted amino group, or $R^1$ represents one selected from the group consisting of an alkyl group optionally having a substituent, cycloalkyl group optionally having a substituent, aryl group optionally having a substituent, aralkyl group optionally having a substituent, alkoxyl group optionally having a substituent, aryloxy group optionally having a substituent, and N,N-disubstituted amino group, and $R^2$ and $R^3$ represent a joined arylenedioxy group optionally having a substituent, wherein at least one of $R^1$, $R^2$, and $R^3$ is an aryloxy group that may have a substituent.

* * * * *